United States Patent [19]
Van Mourik

[11] Patent Number: 6,137,542
[45] Date of Patent: Oct. 24, 2000

[54] DIGITAL CORRECTION OF LINEAR APPROXIMATION OF GAMMA

[75] Inventor: Johannes G. R. Van Mourik, Knoxville, Tenn.

[73] Assignee: Phillips Electronics North America Corporation, New York, N.Y.

[21] Appl. No.: 09/217,410

[22] Filed: Dec. 21, 1998

[51] Int. Cl.[7] .................................................. H04N 5/202
[52] U.S. Cl. ............................................. 348/674; 348/674
[58] Field of Search ..................................... 348/671, 674, 348/675, 254; H04N 5/202, 9/69

[56] References Cited

U.S. PATENT DOCUMENTS

| | | | |
|---|---|---|---|
| 5,408,267 | 4/1995 | Main | 348/674 |
| 5,768,442 | 6/1998 | ahn | 382/274 |

FOREIGN PATENT DOCUMENTS 0457522  11/1991  European Pat. Off. ....... H04N 5/202

OTHER PUBLICATIONS

"KS0127 Programmable Gamma Correction", Application Notes, Multimedia Video, Samsung Electronics.

*Primary Examiner*—Sherrie Hsia
*Attorney, Agent, or Firm*—Edward W. Goodman

[57] ABSTRACT

A circuit for gamma correcting a video signal incorporates both linear approximation as well as a look-up table, in which the disadvantages of linear approximation, i.e., inaccurate representation of the gamma function, and of a gamma look-up table, i.e., low resolution at low grey levels, are minimized. The transfer function of the look-up table is chosen such that the inaccuracies of the linear approximation are compensated.

6 Claims, 3 Drawing Sheets

DIGITAL CORRECTION OF LINEAR APPROXIMATION OF GAMMA

BACKGROUND OF THE INVENTION

1. Field of The Invention

The subject invention relates to the display of color video and data graphic signals, and more particularly, to displaying color video and data graphic signals on a linear display.

All video and data graphic sources assume that the information will be displayed on a CRT-like device, i.e., a display device with a non-linear luminance output/electrical input function. The assumed function is the so-called gamma function, where $V_{OUT}=V_{IN}^{\gamma}$, where $\gamma=2.2$–$2.8$. However, various flat displays, including plasma display panels (PDP's), have a linear response, i.e., $\gamma=1.0$. If this discrepancy is not corrected, the displayed picture has a pale appearance with little color saturation.

2. Description of The Related Art

Typically, digital video signal processing is carried out using 8 bits. As shown in FIG. 1, after analog-to-digital conversion in A/D converter 10, a gamma look-up table 12 can be used to interface between the 8-bit processing and an 8-bit PDP 14. Here, the look-up table 12 uses a list of 256 8-bit values for each color, each of these values being corrected with respect to gamma. The most common way of realizing the look-up table 12 is by using a (P)ROM or a RAM.

In the case of a 10-bit PDP, U.S. patent application Ser. No. 09/191,842, filed Nov. 13, 1998, assigned to the Assignee of this application, discloses a circuit for converting an 8-bit input video signal into a 10-bit gamma corrected output video signal for application to a PDP.

FIG. 2 shows a graph of a gamma curve (solid line), where gamma ($\gamma$)=2.2. As can be seen, the curve is very flat at the beginning, at low grey levels. This means that a large number of input codes are mapped onto a few output codes resulting in a loss in resolution.

Alternatively, it is known to use linear approximation to correct for gamma in a video signal. As shown in FIG. 3, the output from the A/D converter 10 is applied to a linear approximation circuit 16 which then applies the gamma corrected video signal to the linear display 14. Samsung Electronics markets a color decoder containing a programmable gamma correction unit KS0127 which allows a user to apply many different types of corrections. Depending on the type of correction needed, only a limited number of values are stored in the unit, and the unit uses linear interpolation to generate the in between values. FIG. 2 also shows a graph of a linear approximation curve (dotted line) in which 4 linear segments are used. However, the results have not proven to be acceptable, in that errors occur where the linear approximation curve deviates from the (ideal) gamma curve.

SUMMARY OF THE INVENTION

It is an object of the present invention to provide a circuit for gamma correcting an input video signal in which greater resolution at low grey level is achieved.

It is a further object of the present invention to provide a circuit for gamma correcting an input video signal in which inaccuracies due to linear approximation of an ideal gamma function are minimized.

These objects are achieved in a circuit for gamma correcting an input video signal for application to a linear display, said circuit comprising input means for receiving the input video signal; means for digitizing the input video signal; linear approximation means for linearly approximating a gamma function using a predetermined number of linear segments; and 8-bit look-up table means containing 8-bit gamma table values, wherein a transfer function of the look-up table corrects differences between said gamma function and said linear approximation.

Applicant realized that by combining linear approximation with a gamma look-up table, the disadvantages of both approaches could be minimized. In particular, the transfer function of the look-up table is chosen such that it corrects for any differences between the linear approximation and the gamma function. As such, this transfer function exhibits an initial rapid rise thereby improving the resolution of dark gray levels, i.e., less codes are lost when compared to a gamma look-up table.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

Figure 4:
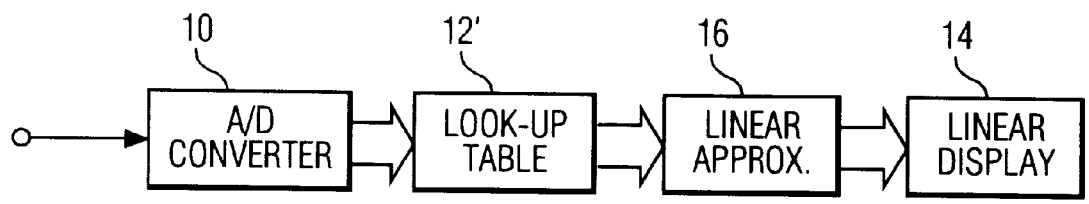
FIG. 4 shows a block schematic diagram of a gamma correction circuit of the subject invention using a combination of a look-up table and linear approximation.
Figure 2:
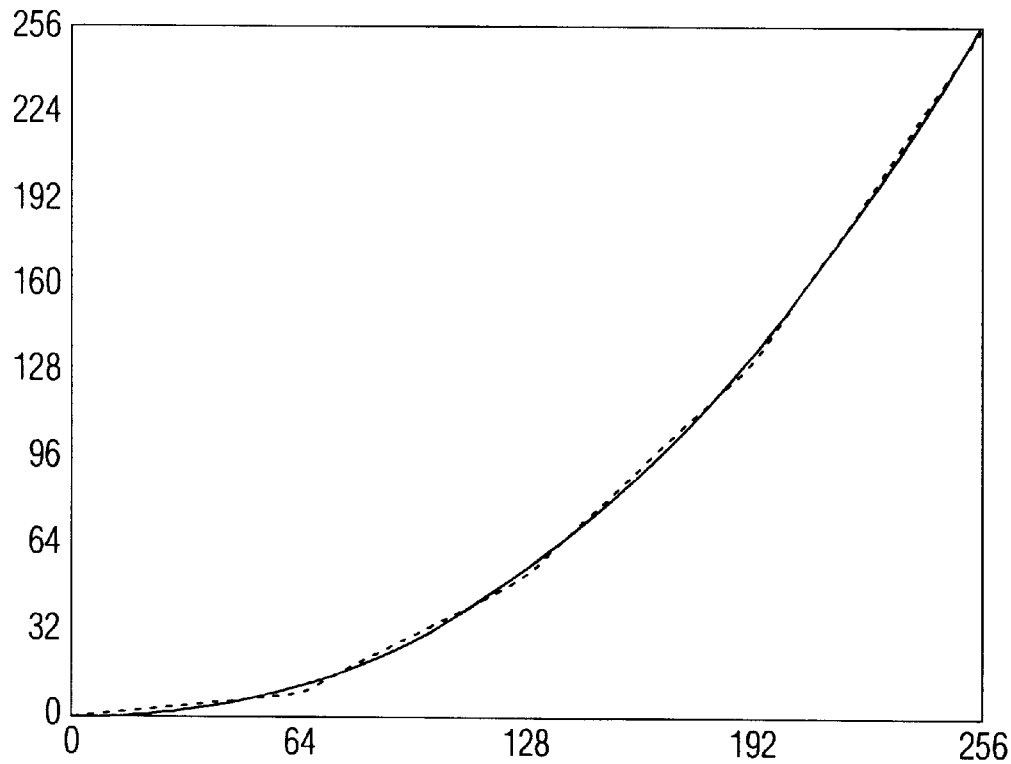
FIG. 2 shows a graph of a gamma function in a solid line, and a linear approximation thereof in dotted lines.

FIG. 4 shows a block diagram of an embodiment of the subject invention. In particular, an input video signal is applied to the A/D converter 10. The output of the A/D converter 10 is applied to a look-up table 12'. The output from the look-up table 12' is then applied to the linear approximation circuit 16 which applies the gamma corrected video signal to the linear display 14.

Figure 1:
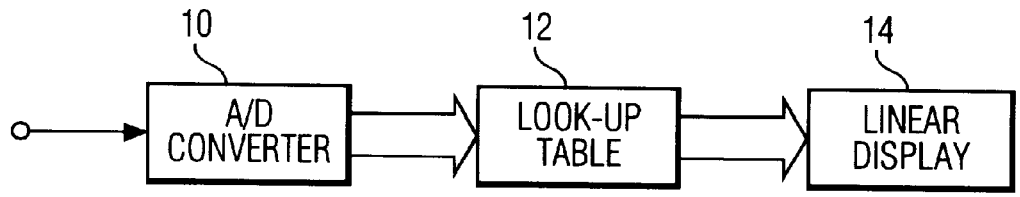
FIG. 1 shows a block schematic diagram of prior art gamma correction using a look-up table.
Figure 3:
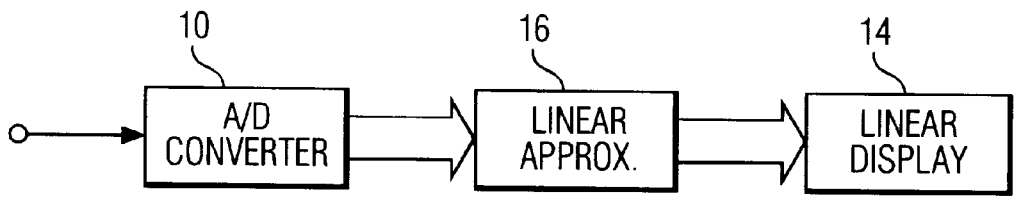
FIG. 3 show a block schematic diagram of a prior art gamma correction using linear approximation.
Figure 5:
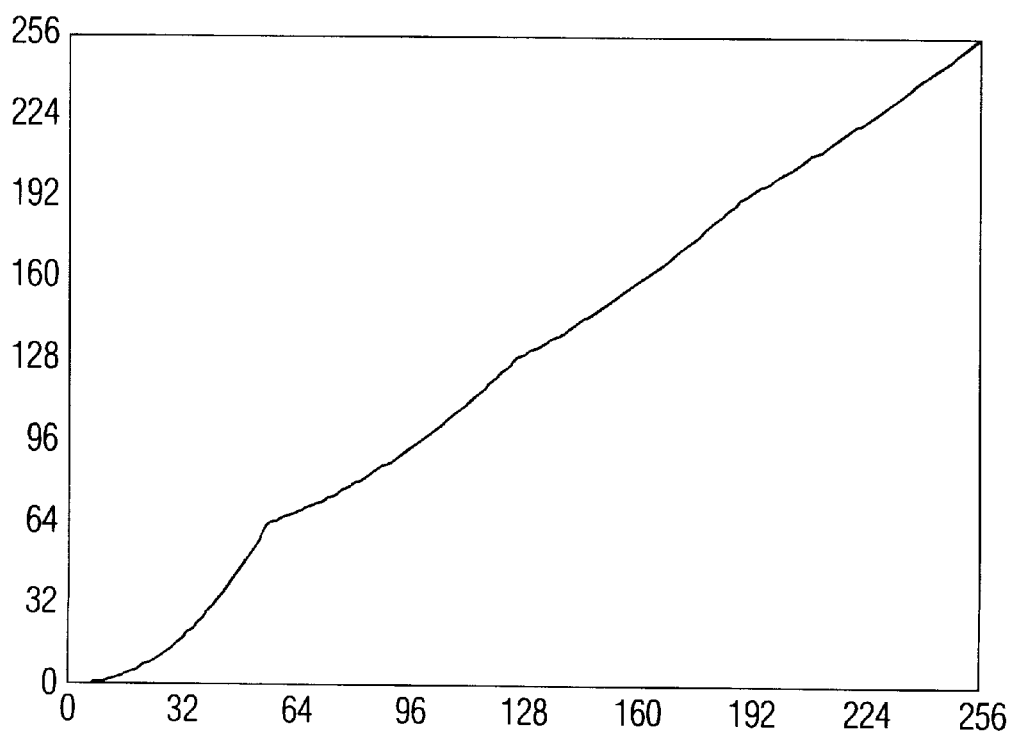
FIG. 5 shows a graph of the transfer function of the look-up table of FIG. 4.
Figure 6:
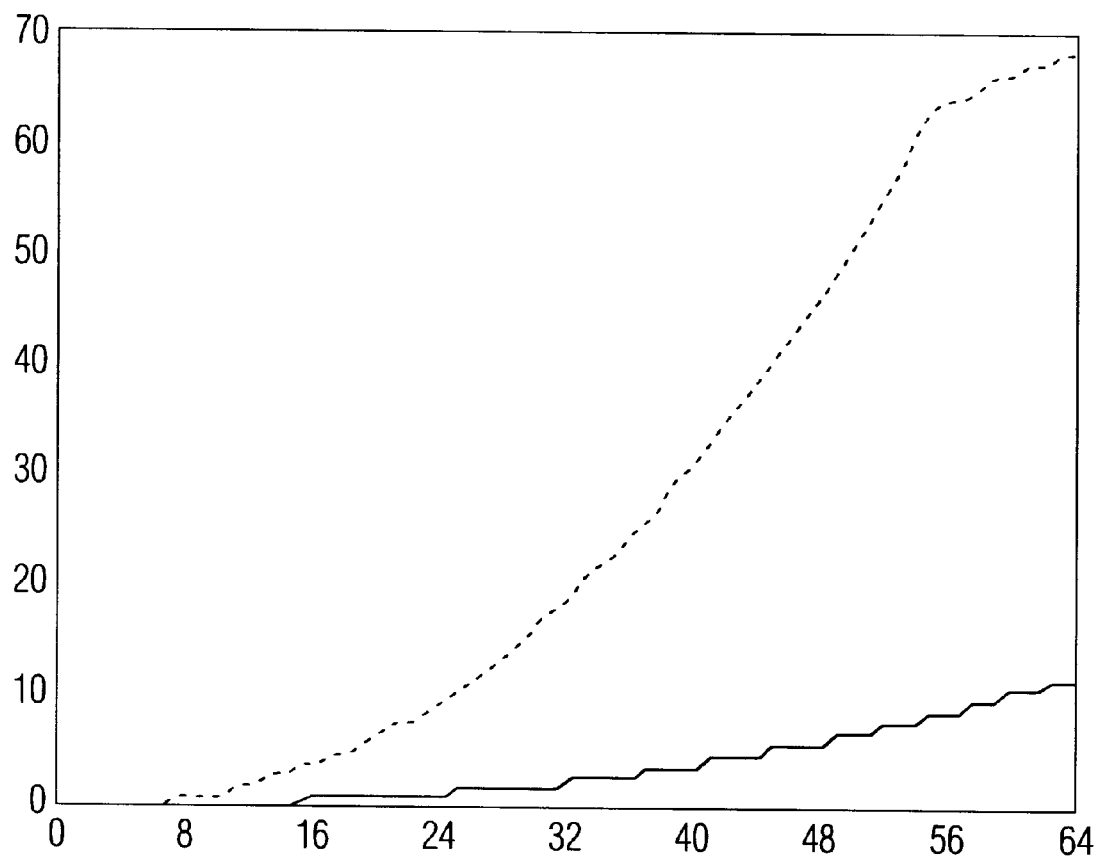
FIG. 6 shows a graph of the initial portion of the transfer functions of the look-up tables of FIG. 1 (solid line) and of FIG. 4 (dashed line).

The transfer function of the look-up table 12' is chosen such that it compensates for the inaccuracies of the linear approximation circuit 16. FIG. 5 shows the transfer function of the look-up table 12' when the linear approximation circuit 16 uses 4 linear segments. The first 64 bytes of the transfer function of the look-up table 12' are shown in FIG. 6 as a dotted line. This should be contrasted with the transfer function of the look-up table 12 of FIG. 1, shown as a solid line. It should be apparent that the resolution of low (dark) grey levels is better, i.e., less codes are lost, as compared to a standard gamma look-up table.

It should be noted that the order of the look-up table 12' and the linear approximation circuit 16 may be reversed. In addition, if the linear display 14 requires a 10-bit signal, a look-up table in accordance with U.S. patent application Ser. No. 09/191,842, filed Nov. 13, 1998 may be used in which the transfer function is adjusted accordingly.

While the present embodiment only shows a single look-up table 12' and a single linear approximation circuit 16 implying a monochrome video signal, it should be apparent that the subject invention is equally applicable to color video signals, wherein separate look-up tables and separate linear approximation circuits are used for the three color signals, or, alternatively, for the luminance signal and two chrominance signals.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A circuit for gamma correcting an input video signal for application to a linear display, said circuit comprising:

input means for receiving the input video signal;

means for digitizing the input video signal;

linear approximation means for linearly approximating a gamma function for said digitized input video signal using a predetermined number of linear segments; and 8-bit look-up table means coupled to an output of said linear approximation means, said 8-bit look-up table means having an output for providing a gamma corrected video signal, and containing 8-bit gamma table values, wherein a transfer function of the look-up table means corrects differences between said gamma function and the linear approximating of said linear approximation means.

2. A circuit as claimed in claim 1, wherein said predetermined number of linear segments is 4.

3. A circuit as claimed in claim 1, wherein the transfer function of the 8-bit look-up table means is further adjusted to achieve greater resolution at low gray level.

4. A circuit for gamma correcting an input video signal for application to a linear display, said circuit comprising:

input means for receiving the input video signal;

means for digitizing the input video signal; and linear approximation means for linearly approximating a gamma function for said digitized input video signal using a predetermined number of linear segments, wherein said circuit further comprises:

8-bit look-up table means coupled between said digitizing means and said linear approximation means, said 8-bit look-up table means containing 8-bit gamma table values, wherein a transfer function of the look-up table means corrects differences between said gamma function and the linear approximating of said linear approximation means.

5. A circuit as claimed in claim 4, wherein said predetermined number of linear segments is 4.

6. A circuit as claimed in claim 4, wherein the transfer function of the 8-bit look-up table means is further adjusted to achieve greater resolution at low gray level.

\* \* \* \* \*